INVENTOR.
SAMUEL A. SCHWARTZ

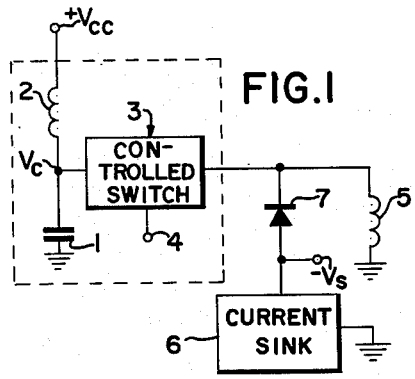
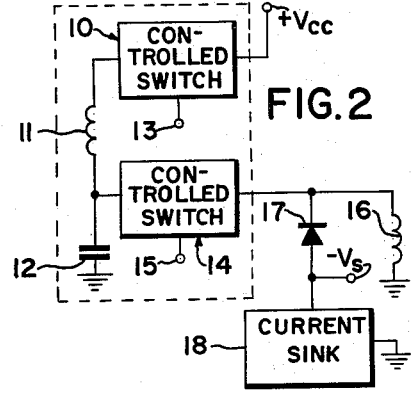
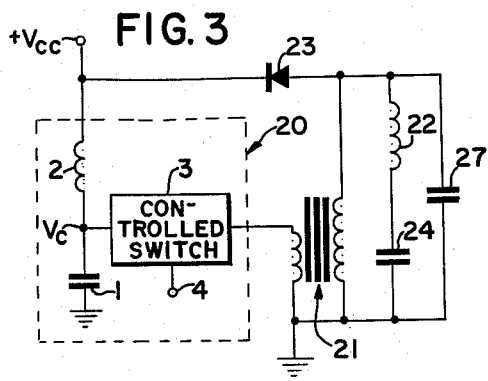
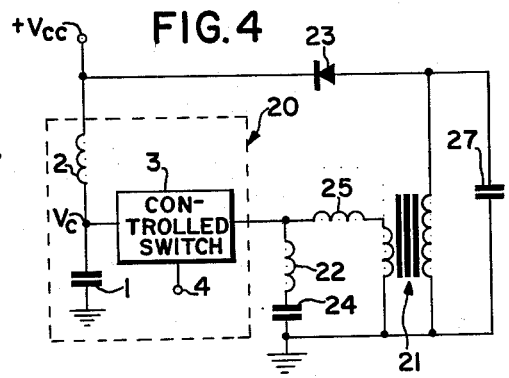
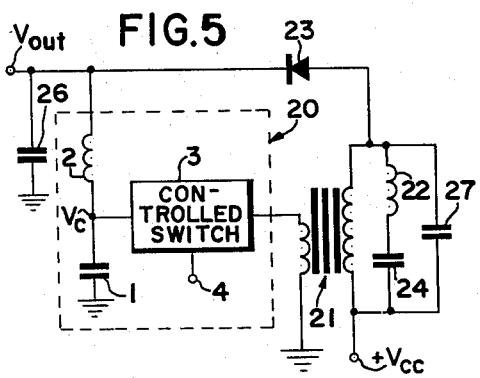
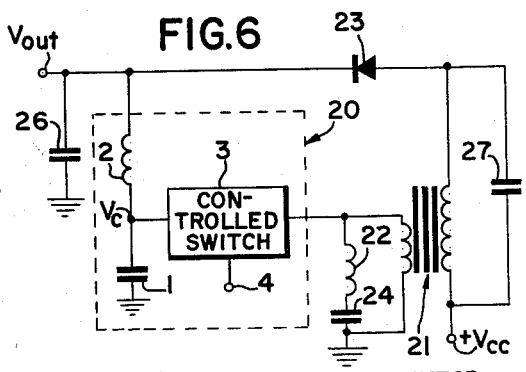
INVENTOR.
SAMUEL A. SCHWARTZ

United States Patent Office 3,179,843
Patented Apr. 20, 1965

3,179,843
COMBINED TELEVISION SWEEP CURRENT
GENERATOR AND POWER SUPPLY
Samuel A. Schwartz, Los Altos, Calif., assignor to Fairchild Camera and Instrument Corporation, Syosset, N.Y., a corporation of Delaware
Filed Jan. 14, 1963, Ser. No. 251,309
6 Claims. (Cl. 315—27)

This invention relates to a new type of sawtooth wave current generator wherein the switching device or devices are switched at low current levels. By this means the apparatus of this invention makes possible the use of efficient controlled rectifiers, if desired, for the switching elements. Such rectifiers, particularly silicon controlled rectifiers, have very precise switching characteristics and a high power-handling capacity.

In almost all conventional sawtooth wave current generators, a large current will be passing through the switch at the time when switching occurs between the charging portion of the cycle and the discharging portion. For this reason, it has formerly been necessary to employ power transistor switches, or similar costly elements. Controlled rectifiers could not be used, for if a large current is passing through them while they are on, they will not respond to a signal on their input and switch to their off state; yet for many reasons, particularly their relatively small size and precise switching characteristics, they would be very desirable.

The present invention provides a new circuit for generating sawtooth current waves. This new circuit has very little current passing through the switch or switches during the switch from the charging to the discharging portion of the cycle. Controlled switches, particularly controlled rectifiers, may thus be advantageously employed. (Of course, other types of switches may still be used, if desired.) Briefly, the circuit provides its sawtooth current wave output by alternately charging a capacitor and discharging it through an inductive load; the energy stored in the magnetic field surrounding the inductor is then discharged into a current sink. The current through this load has a sawtooth wave shape. In one important application of the invention, the inductive load serves as the yoke on a cathode ray tube in a television receiver or other cathode ray tube display apparatus. The sawtooth current wave through the yoke provides the source of sweep current for the horizontal sweep across the screen. For reasons to be described later, the sawtooth wave output provided by the apparatus of this invention has characteristics which are more desirable than the sawtooth waves achieved by apparatus of the prior art.

Although the detailed description which follows makes reference to a horizontal sweep circuit in a television receiver, the apparatus of the invention has many other applications. For example, because the circuit can provide and A.-C. output from a D.-C. input, it may be used as an inverter, such as that used in an automobile. The apparatus of the invention is also useful in a battery charger or other power supply equipment requiring a constant power output.

The invention may be best understood by reference to the following detailed description and the drawings, in which:

FIG. 1 is a schematic circuit diagram of the apparatus of one embodiment of the invention wherein a single controlled rectifier is used as the switch;

FIG. 2 is a schematic circuit diagram of the apparatus of another embodiment of the invention wherein two controlled rectifiers are used as the switches;

FIG. 3 is a schematic circuit diagram of another embodiment of the invention wherein the box represents the portion shown dotted in one of the circuits in FIGS. 1 and 2;

FIG. 4 is a schematic circuit diagram of still another embodiment of the invention wherein the box again represents the portion shown dotted in one of the circuits in FIGS. 1 and 2;

FIG. 5 is a schematic circuit diagram of another embodiment of the invention using a different location for the power supply, and providing an auxiliary source of voltage—again a box is used to represent the same circuit as it did in FIGS. 3 and 4;

FIG. 6 is a schematic circuit diagram of apparatus similar to that shown in FIG. 5, but with the load circuit differently located;

Figure 7:
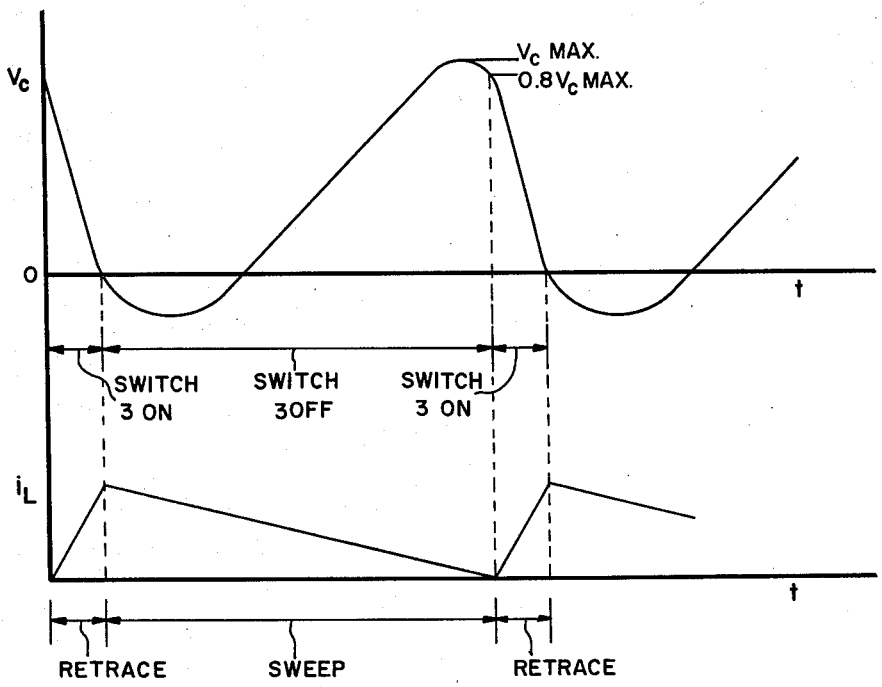
FIG. 7 is a graph showing the capacitor voltage and load current as a function of time for the circuit shown in FIG. 1.

Referring to the circuit shown in FIG. 1 and the graph shown in FIG. 7, a D.-C. supply voltage (shown as $V_{cc}$) may be seen connected in series with capacitor 1 through charging inductor 2. The charging inductor 2 is used to achieve a sinusoidal charging cycle with the least possible power loss in the charging circuit. After the maximum capacitor voltage $V_c$ has been attained, $V_c$ begins to fall off in the normal oscillation manner of an L-C circuit—always provided, however, that switch 3 (shown here as a controlled rectifier, preferably a semiconductor controlled rectifier) remains open so that the stored charge in capacitor 1 cannot be released. As $V_c$ decreases, the electrostatic energy stored in capacitor 1 is transferred to become magnetic field energy in the inductor. At a suitable moment following attainment of peak $V_c$ (such as the point where $V_c$ has declined to about 80 percent of peak value, as shown in FIG. 7), the switch 3 is closed. The eighty percent point on the declining voltage slope was chosen to insure that the switching would always occur on the declining portion of the $V_c$ curve in spite of any small changes in supply voltage $V_{cc}$.

When the switch 3 is a controlled rectifier, a switching pulse into input 4 switches it from non-conducting to conducting; in a sweep circuit such switching recurs at fixed intervals. The switching pulses are provided by a timer or clock pulse generator, and are phased with the oscillations of the L-C circuit in such a manner that the controlled rectifier is always switched on at the eighty percent point shown in FIG. 7.

At the moment controlled rectifier 3 is turned on, capacitor 1 will immediately begin to discharge its stored charge through the controlled rectifier (which has become essentially a short circuit) and through the inductive load 5. In a television sweep circuit, the inductive load is, in fact, the yoke on the neck of the cathode ray tube; the current through inductor 5 thus governs the position of the sweep across the screen of the cathode ray tube. The waveform of this current should be a sawtooth. A sawtooth waveform has two components, the sweep portion and the retrace portion. The sweep portion of the waveform extends from the point at which current through the load 5 is maximum to the point where is it minimum; to achieve a uniform sweep, the decay of current between these points should be as linear as possible. The portion of the waveform extending from minimum current back to maximum is called the retrace. This current curve is shown in FIG. 7. The retrace portion is generated when controlled rectifier 3 is switched on; the sweep portion is generated when controlled rectifier 3 is switched off.

Still referring to the two curves in FIG. 7 and to the circuit of FIG. 1, it may be seen that as $V_c$ further declines after switch 3 has been turned on, current passes through switch 3 and load 5. The current rapidly builds up the stored magnetic field energy in the inductors. Most of this energy appears in the load 5, although a small amount will be found in the charging inductor 2. In addition, a negligible amount of energy will have been lost in the switch 3. At the point where $V_c$ becomes negative, current will commence to flow through switch 3 in the reverse direction, i.e., from load 5 into capacitor 1. However, very shortly after this reverse flow begins, switch 3 is turned off, and thereby becomes non-conductive. Certain controlled switches, controlled rectifiers for example, spontaneously become non-conductive after a reverse current has passed through them for a brief period of time, only a few microseconds or as little as a few nanoseconds. The only way to make the switch conductive again is to apply another trigger pulse to input 4.

Shortly after switch 3 turns off, the voltage $V_c$ on capacitor 1 will reach its minimum and will again begin to increase, as shown in the plot of $V_c$ in FIG. 7. No further current can be sent to the load 5 after switch 3 has been opened. The magnetic field in the load 5 reaches its maximum value about the time switch 3 is opened; shortly thereafter, load 5 will begin to discharge current because of the energy stored as magnetic field surrounding load 5. Since this current flows in the opposite direction from the charging current, a reverse voltage builds up across the load 5. When this reverse voltage reaches $-V_s$ (the voltage of the current sink 6), diode 7 will become conductive. The current sink 6 has opposite voltage polarity from the supply voltage to keep diode 7 non-conductive during the portion of the sweep cycle where capacitor 1 is discharging into load 5. Almost immediately after switch 3 is opened, the reverse voltage on load 5 will become sufficient to compensate for the voltage $-V_s$ of the current sink, since $V_s$ is generally substantially less in magnitude than $V_{cc}$; diode 7 then becomes conductive. On the plot of load current in FIG. 7, the point at which switch 3 is opened (and diode 7 immediately becomes conductive) is the point where the retrace portion of the curve ends and the sweep portion commences. Because diode 7 remains conductive during the sweep portion of the curve, the voltage across inductive load 5 must remain fixed at the sink voltage $-V_s$. Diode 7 and sink 6 act together as a clamping circuit to clamp the inductive load 5 at a constant voltage. The rate of current change through the inductive load 5 with time is proportional to the clamping voltage divided by the inductance of the load. Since both of these parameters are constants during the current discharge from inductive load 5 into current sink 6 (the sweep portion of the cycle), the rate of current change with time is a constant; the decay in load current is thus linear.

After the magnetic field in the load has been completely discharged as current to the sink 6, switch 3 is triggered by the clock pulse to its input 4 and the retrace portion of the cycle begins. In this portion of the cycle, capacitor 1 discharges into load 5, and the load current builds up sinusoidally, as shown in the plot of load current in FIG. 7.

Throughout the time during which the inductive load 5 is discharging current into the sink 6 (the sweep portion of the cycle), capacitor 1 is being charged. As soon as the capacitor has become fully charged and the voltage across it ($V_c$) has begun to fall off (at about 80 percent of its maximum value), switch 3 is pulsed and the retrace portion of the cycle commences.

Another embodiment of the invention using two switches is shown in FIG. 2. The explanation of the operation of this circuit (which is similar to the single-switch circuit described above) may be best understood by reference to FIGS. 2 and 8. One advantage of the two-switch circuit is that a higher voltage may be placed across the capacitor, and therefore a larger amount of charge may be stored and discharged into the load when the second controlled switch is triggered. In this circuit, the charging circuit, having switch 10, inductor 11, and capacitor 12, is relatively independent of the discharging circuit. To start charging the capacitor 12, a trigger signal is sent to input 13 of switch 10 (shown as a controlled rectifier). The charging inductor 11 is used to control the charging rate of capacitor 12. It will be apparent that a resistor could be substituted for the inductor, but the power losses in a resistor make this substitution less desirable. As soon as the maximum charge on capacitor 12 has been reached (in this case, twice the supply voltage $V_{cc}$), the current in the circuit attempts to reverse, in the same manner as described above for the single switch circuit. However, as soon as a small current begins to flow through switch 10 toward inductor 11, switch 10 opens; the controlled switch becomes non-conductive with brief passage of a small reverse current.

Figure 8:
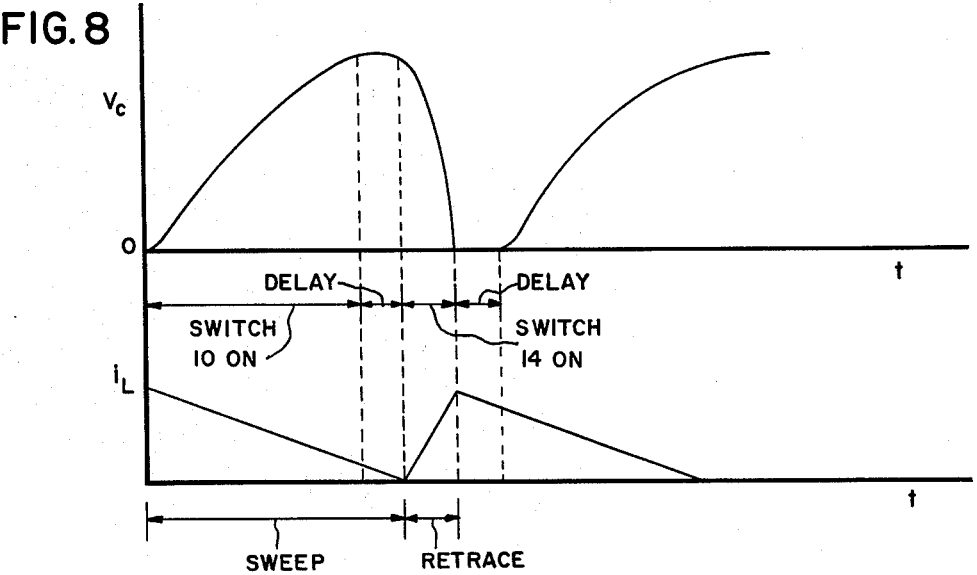
FIG. 8 is a graph showing the capacitor voltage and load current as a function of time for the circuit shown in FIG. 2.

For a short delay period, used here to insure the proper switching sequence, the voltage on capacitor 12 remains essentially constant, as shown in FIG. 8. Following this brief (in the order of a few microseconds) delay period, switch 14 is triggered by a pulse to its input terminals 15. Switch 14 becomes conductive so that capacitor 12 discharges its stored charge through inductive load 16. As soon as the voltage across capacitor 12 reaches 0, indicating that the capacitors entire charge has been discharged through inductive load 16, the magnetic field on the inductive load will start to decrease, sending a small reverse current through switch 14. This causes the switch to turn off, as shown in FIG. 8, and thus allows the inductive load 16 to discharge its stored magnetic field as current through diode 17 and into current sink 18. The voltage across inductive load 16 is held constant by the clamping action of diode 17 and sink 18, in the manner described above for the single-switch embodiment. As will be seen from FIG. 8, the decay rate of current during sweep is constant. After a short delay from the time switch 14 is turned off, switch 10 is again turned on. This delay likewise insures that the proper switching sequence of switches 10 and 14 will obtain regardless of slight timing and voltage variations. During the portion of the cycle where switch 10 is on, but switch 14 is off, capacitor 12 is charging independent of current discharge from inductive load 16 into sink 18.

In the circuits shown in FIGS. 1 and 2, the power stored in the form of a magnetic field in the inductive load is discharged from that load into a current sink. This power is lost unless it can be used elsewhere, and so represents a waste of a certain amount of energy during each cycle. The circuits shown in FIGS. 3 and 4 almost entirely eliminate this waste.

Referring now to FIG. 3, box 20 represents the circuitry shown dotted in FIGS. 1 and 2. The contents of this box may be either the single-switch circuitry of FIG. 1 or the two-switch circuitry of FIG. 2. The essential difference between this circuit and the previous ones is the presence of step-up transformer 21 between the circuit of box 20 and inductive load 22. The transformer 21 serves to step up the voltage across the load to a level higher than the supply voltage $V_{cc}$. The supply voltage $V_{cc}$ can then serve the dual function of a voltage supply and a voltage sink. It is apparent that use of the supply as a sink makes possible the re-use of substantially all the power discharged as current from the inductive load 22 through diode 23. Only the very small losses, such as the losses in the switch (or switches), the diode, and the inductors cannot be recovered. The circuit of this embodiment is therefore much more efficient than the circuits in FIGS. 1 and 2. The operation of this circuit using a single switch is the same as the operation of the FIG. 1 circuit; that of the circuit using two switches is the same as the operation of the FIG. 2 circuit.

The circuit shown in FIG. 3 has another important advantage. Although it might be expected that addition of a transformer to the circuit would introduce non-linearities into the otherwise linear sweep current waveform, such is not the case. Most transformers do have minor imperfections such as winding losses, interwinding reactance, and the like; however, transformer 21 is active only during the transfer of energy from the storage capacitor to the inductive load during the retrace portion of the cycle. During the sweep portion of the cycle, when the inductive load is discharging through diode 23 into the voltage supply, the transformer is not even used in the circuit, and can therefore have no adverse effect upon the linearity of the sweep curve. This feature is very important in television applications, because the sweep curve is the only portion of the sawtooth which affects the linearity in the display. In other words, during the sweep portion (again see FIG. 8), the primary transformer 21 is open-circuited by the switch in box 20.

Another advantage of the circuit of FIG. 3 over the previous circuits without the transformer is a reduction in power loss across diode 23. Since a step-up transformer increases voltage but decreases current, the total amount of current through diode 23 is greatly reduced, relative to the amount of current through diodes 7 or 17, in FIGS. 1 or 2, respectively. Thus the power loss in the diode because of its small forward resistance is greatly lessened, because this power loss is proportional to the square of the current through the diode.

Transformer 21 has preferably a tight coupling between the primary and secondary windings to keep its leakage reactance low. Since energy is stored in leakage reactances, these reactances will cause transients to appear in the secondary when the circuit is switched from charging the load to discharging it through the diode 23. The transients are then discharged through the diode along with the magnetic field energy from the load, making it necessary for diode 23 to be capable of handling larger amounts of power than would otherwise be required. Such additional power capacity makes the diode more costly and less efficient.

Another factor affecting the power requirement for diode 23 is the ringing frequency of the transformer 21. All practical transformers have such a ringing frequency. A high ringing frequency causes a high voltage transient on the secondary winding of transformer 21. The higher these transient voltages, the higher the power rating required of the diode. The transients can be reduced to minimum value by connecting in parallel with the secondary winding of transformer 21 a capacitor 27 whose capacity is selected to resonate with the leakage reactance of the transformer. This lowers the ringing frequency so that one half-cycle of the ringing frequency is equal to the retrace cycle. The addition of such a capacitor 27 has been found to appreciably reduce the power rating requirement for diode 23.

A tightly coupled transformer may have an augmented distributed capacity. This capacity can cause a large current surge through the controlled switch in box 20. To avoid damage to the controlled switch from this surge, it is sometimes desirable to place a small inductor 25 in series with the primary of transformer 21. This inductor (on the order of a few microhenries) limits the rate of voltage rise across the distributed transformer capacity. By limiting the rate of rise, the peak current of the current surge through the switch is reduced. This precaution may prolong the life of the controlled switch by a considerable extent.

Still referring to FIG. 3, capacitor 24 has an important function. When the circuit is used as a horizontal sweep circuit, it is essential that the D.-C. component of the sweep current be removed to avoid decentering. If allowed to decenter, the sweep would commence somewhere in the middle of the screen and proceed of the edge, losing part of the picture. By capacitatively coupling the transformer 21 to the inductive load (the yoke), the D.-C. component of sweep current is eliminated and the decentering effect is thus avoided. As an additional advantage, the load 22 may be tuned with capacitor 24 to one-half the sweep frequency. This introduces the necessary S curvature distortion, well known in the art, for sweeping wide angle cathode-ray tubes.

Another embodiment of the invention is shown in FIG. 4. This circuit is much the same as the circuit of FIG. 3 except that the inductive load 22 and series capacitor 24 are connected across the primary of the transformer 21 rather than the secondary. Power losses are again reduced by discharging the load current back into the voltage supply. However, in this embodiment, transformer 21 is part of the load current discharge circuit; this means that transformer imperfections may affect the sweep portion of the current waveform.

Using either the two-switch circuit or the single-switch circuit, it is sometimes highly desirable to have the sweep curve of current constant in amplitude and decay rate in spite of small changes in the D.-C. supply voltage level. It is well known that television supply voltages may vary slightly from time to time, and it is important that these variations do not affect the sweep waveform. The sweep current waveform may be made independent of small D.-C. supply voltage variations by (1) varying the charging inductances inversely with the D.C. voltage, and (2) varying the load inductance directly with the D.-C. supply voltage. The decrease of charging inductance causes the maximum voltage on the capacitor ($V_{c\ max}$) to appear sooner. But, because of the increased supply voltage, this maximum capacitor voltage is greater, and therefore more time must be allowed for capacitor voltage $V_c$ to decline before the switch is turned on. The decrease in charging inductance is just sufficient that the peak capacitor voltage is reached earlier than in the previous embodiments, to allow this extra decline of $V_c$ before the switch turns on. The voltage $V_c$ at turn-on is constant in spite of changes in D.-C. supply voltage level, providing a constant initial current level for the sweep curve.

It will be recalled that in order to make the slope of current decline through the inductive load linear, a constant voltage across the load was necessary. This load voltage is a fixed fraction of the supply voltage, the exact value being determined by the circuit constants. The decay rate of load current is proportional to the constant load voltage divided by the load inductance. As an additional precaution, to keep this decay rate constant in spite of small changes in D.-C. supply voltage, the load inductance may be caused to vary directly with the D.-C. supply voltage. This variation in inductance compensates exactly for the variation in supply voltage, and maintains the decay rate at a contant value.

The above variations in the charging inductance and the load inductance may be accomplished either by using variable inductors for these elements, or by placing a variable inductor in series with them. The latter method is preferable in the case of a load inductance which serves as the yoke on a cathode-ray tube, because it permits the yoke inductance to remain constant.

The circuits shown in FIGS. 5 and 6 are much the same as the circuits shown in FIGS. 3 and 4, respectively, except for a difference in the location of voltage supply $V_{cc}$, and the addition of storage capacitor 26. The operation of these circuits is also essentially the same as that of the previous two shown in FIGS. 3 and 4. The major difference between the two circuits is that diode 23 discharges current from inductive load 22 into capacitor 26. A stored charge will thus build up in capacitor 26 until its voltage is equal to a fixed maximum voltage. After this build-up (during a few warm-up sweep cycles), this voltage will remain available for operation of other parts of the television receiver. Through use of the step-up transformer, this voltage is considerably higher than the supply voltage $V_{cc}$. As an example, the circuit may be designed so that $V_{cc}$ is a 12-volt battery (such as a car battery), and the $V_{out}$ across capacitor 26 is much larger.

When the circuits of FIGS. 5 and 6 are used in a television receiver, the secondary winding may have an additional tap at a still higher voltage to derive power for the rectifier used to supply the picture tube ultor voltage. The lower voltage windings of the secondary may be used to power the other circuits in the receiver. By this increase in the usefulness of the transformer already present in the horizontal sweep circuit, the need for power transformers in the set is thus completely eliminated. This not only lowers the cost of the set, but substantially reduces its size and weight. This consideration is of major importance in the manufacture of portable television receivers.

The sawtooth wave current generator of this invention has many advantages over its predecessors. First, as mentioned earlier, it permits the use of efficient, reliable, controlled switches—particularly silicon controlled rectifiers—in place of the high-power switching transistors formerly required for switching at high current levels. Second, the sawtooth current wave output is remarkably linear. Even when a transformer is used as shown in FIG. 3, the imperfections in the transformer have no effect on the sweep portion of the curve, only on the retrace. This characteristic means that in a television horizontal sweep circuit, that part of the sweep current affecting the picture is unaltered by transformer imperfections. Third, the circuit components carrying current during the sweep portion of the curve are not changed midway in the sweep. In prior-art circuits, current was conducted by a diode for one part of the sweep portion of the waveform, and by a switch for the remaining portion. This change midway in the sweep often introduced non-linearity due to a difference in voltage drop between the diode and the switch. Finally, the circuit as used in the embodiments of the invention shown in FIGS. 3-6 is extremely efficient. Energy is transferred first from the voltage supply to the capacitor; then from capacitor to load; and finally, from the load back into the voltage supply. The only energy losses are the small resistive losses in the circuit components themselves.

As will be apparent to one skilled in the art, many modificatons may be made in the invention described above without departing from its spirit and scope. Therefore the only limitations to be placed upon that scope are expressed in the claims which follow.

What is claimed is:

1. A television sweep current generator comprising:
   a first capacitor,
   an inductive load,
   a transformer having primary and secondary windings,
   means for charging said first capacitor connected in series with said secondary winding,
   a normally open switch which may be closed by an electric signal and is then automatically reopened when a small reverse current passes through it, said switch connected to series couple said first capacitor to said primary winding so that when said switch is open, said first capacitor is prevented from discharging its stored charge through said primary winding, and when said switch is closed, said first capacitor discharges its stored charge through said primary winding,
   means coupling said inductive load in parallel with the secondary winding of said transformer,
   a second capacitor for receiving stored current discharging from said inductive load,
   clamping means coupled to said inductive load for clamping said load at a fixed voltage during said discharge of current to maintain said discharge at a substantially constant rate,
   means for momentarily closing said normally open switch, thereby allowing said first capacitor to discharge its stored charge through said primary winding of said transformer, and
   a pair of terminals connected for receiving a voltage across said second capacitor.

2. The television sweep current generator of claim 1 further defined by said clamping means including a diode connected to series couple said parallel coupled load and secondary winding with a point of constant voltage, said diode being connected for forward conduction of current in the direction towards said constant voltage point.

3. A television sweep current generator comprising:
   a capacitor,
   an inductive load,
   a normally open switch which may be closed by an electric signal, and is then automatically reopened when a momentary reverse current passes through it, said switch connected to series couple said capacitor to said inductive load so that when said switch is open, said capacitor is prevented from discharging its stored charge through said load, and when said switch is closed, said capacitor discharges its stored charge through said load,
   a transformer having primary and secondary windings,
   means for charging said capacitor series coupled to said secondary winding,
   means coupling said primary winding in parallel with said inductive load,
   a second capacitor for receiving stored current discharging from said inductive load,
   clamping means connected to series couple said first capacitor to said secondary winding for clamping said secondary winding at a fixed voltage during said discharge of current to maintain said discharge at a substantially constant rate,
   means for momentarily closing said normally open switch, thereby allowing said first capacitor to discharge its stored charge through said load, and
   a pair of output terminals connected for receiving a voltage across said second capacitor.

4. The television sweep current generator of claim 3 further defined by said clamping means including a diode connected to series couple said secondary winding with a point of constant voltage, said diode being connected for forward conduction of current in the direction towards said constant voltage point.

5. The television sweep current generator of claim 2 further defined by having a capacitor in parallel with said secondary winding of said transformer.

6. The television sweep current generator of claim 3 further defined by having a capacitor in parallel with said secondary winding of said transformer.

References Cited by the Examiner

UNITED STATES PATENTS 2,995,679   8/61   Skoyles _____ 315—27 X

OTHER REFERENCES

Mackintosh: "The Electrical Characteristics of Silicon P-N-P-N Triodes," Proceedings of IRE, June 1958, page 1229.

DAVID G. REDINBAUGH, *Primary Examiner.*